(12) United States Patent
Furuta (10) Patent No.: US 11,106,780 B2
(45) Date of Patent: Aug. 31, 2021

(54) ELECTRONIC DEVICE

(71) Applicant: SEIKO EPSON CORPORATION, Tokyo (JP)

(72) Inventor: Yasuhiro Furuta, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 301 days.

(21) Appl. No.: 16/245,761

(22) Filed: Jan. 11, 2019

(65) Prior Publication Data

US 2019/0220585 A1    Jul. 18, 2019

(30) Foreign Application Priority Data

Jan. 15, 2018  (JP) .............................. JP2018-004012

(51) Int. Cl.
| | | |
|---|---|---|
| *H04L 29/06* | (2006.01) | |
| *G06F 21/44* | (2013.01) | |
| *H04L 9/32* | (2006.01) | |
| *G06F 21/45* | (2013.01) | |
| *G06F 21/31* | (2013.01) | |

(52) U.S. Cl.
CPC .............. *G06F 21/44* (2013.01); *G06F 21/31* (2013.01); *G06F 21/45* (2013.01); *H04L 9/32* (2013.01); *H04L 63/08* (2013.01)

(58) Field of Classification Search
CPC .......... G06F 21/44; G06F 21/45; G06F 21/31; H04L 63/08; H04L 63/083; H04L 9/32; H04L 9/3226
See application file for complete search history.

(56) References Cited

U.S. PATENT DOCUMENTS

| | | | | |
|---|---|---|---|---|
| 2008/0133914 A1* | 6/2008 | Isaacson | ................. | G06F 21/31 713/170 |
| 2008/0244756 A1* | 10/2008 | Kitada | .................. | G06F 21/608 726/28 |
| 2014/0325595 A1* | 10/2014 | Shinosaki | ........... | G06F 21/6218 726/2 |
| 2017/0272616 A1* | 9/2017 | Ishibashi | ................. | H04L 63/20 |

FOREIGN PATENT DOCUMENTS

JP          2007-156644 A        6/2007

* cited by examiner

*Primary Examiner* — Alexander Lagor
*Assistant Examiner* — Vu V Tran
(74) *Attorney, Agent, or Firm* — Workman Nydegger (57) ABSTRACT

An electronic device that performs authentication of a user where the electronic device improves the convenience of user authentication that employs an LDAP server. An electronic device is configured to connect and communicate with a server storing a plurality of types of authentication information in association with a user for a plurality of users. The electronic device includes an information cache storage that stores user authentication information that is at least a part of the authentication information stored on the server, and an authentication controller that runs a user authentication process on the basis of authentication information entered by a user, and the authentication information acquired from the server. The authentication controller updates the user authentication information stored in the cache information storage after the user authentication process on the basis of the authentication information entered by the user or the authentication information acquired from the server.

3 Claims, 11 Drawing Sheets

FIG. 1

| NAME | AUTHENTICATION INFORMATION ENTERED | AUTHENTICATION SUCCESS CRITERIA | AUTHENTICATION FAILURE CRITERIA |
|---|---|---|---|
| USER ID & PASSWORD AUTHENTICATION | USER ID + PASSWORD (VIA KEYBOARD) | BOTH USER ID AND PASSWORD MATCH (WHERE USER ID IS NOT BLANK) | USER ID MATCHES BUT PASSWORD DOES NOT MATCH (WHERE USER ID IS NOT BLANK) |
| ID NUMBER AUTHENTICATION | ID NUMBER (VIA KEYBOARD) | ID NUMBER MATCHES (WHERE ID NUMBER IS NOT BLANK) | NONE (NOT SATISFIED) |
| CARD ID | CARD ID (VIA CARD TOUCH) | CARD ID MATCHES (WHERE CARD ID IS NOT BLANK) | NONE (NOT SATISFIED) |

CACHE (PRE-EXECUTION):

| USER ID | ID NUMBER | CARD ID |
|---|---|---|
| user1 | number1 | card1 |
| user2 | number2 | card2 |
| user3 | number3 | card3 |
| user4 | number4 | card4 |

AUTHENTICATOR SELECTED: USER ID & PASSWORD AUTHENTICATION

FIG. 5B

AUTHENTICATION INFORMATION ENTERED:

| USER ID | PASSWORD |
|---|---|
| user5 | password5 |

RESULT OF LDAP SEARCH: AUTHENTICATION SUCCESSFUL

FIG. 5C

USER INFORMATION ACQUIRED FROM LDAP:

| USER ID | ID NUMBER | CARD ID |
|---|---|---|
| user5 | number5 | card5 |

FIG. 5D

CACHE (POST-EXECUTION):

| USER ID | ID NUMBER | CARD ID |
|---|---|---|
| user1 | number1 | card1 |
| user2 | number2 | card2 |
| user3 | number3 | card3 |
| user4 | number4 | card4 |
| user5 | number5 | card5 | c

FIG. 6A

CACHE (PRE-EXECUTION):

| USER ID | ID NUMBER | CARD ID |
|---|---|---|
| user1 | number1 | card1 |
| user2 | number2 | card2 |
| user3 | number3 | card3 |
| user4 | number4 | card4 |

AUTHENTICATOR SELECTED: USER ID & PASSWORD AUTHENTICATION

FIG. 6B

AUTHENTICATION INFORMATION ENTERED:

| USER ID | PASSWORD |
|---|---|
| user1 | password1 |

RESULT OF LDAP SEARCH: AUTHENTICATION SUCCESSFUL

USER INFORMATION ACQUIRED FROM LDAP:

FIG. 6C

| USER ID | ID NUMBER | CARD ID |
|---|---|---|
| user1 | number1 | card1 |

CACHE (POST-EXECUTION):

FIG. 6D

| USER ID | ID NUMBER | CARD ID |
|---|---|---|
| ~~user1~~ | ~~number1~~ | ~~card1~~ |
| user2 | number2 | card2 |
| user3 | number3 | card3 |
| user4 | number4 | card4 |
| user1 | number1 | card1 |

FIG. 7A

CACHE (PRE-EXECUTION):

| USER ID | ID NUMBER | CARD ID |
|---------|-----------|---------|
| user1   | number1   | card1   |
| user2   | number2   | card2   |
| user3   | number3   | card3   |
| user4   | number4   | card4   |

AUTHENTICATOR SELECTED: USER ID & PASSWORD AUTHENTICATION
AUTHENTICATION INFORMATION ENTERED:

FIG. 7B

| USER ID | PASSWORD  |
|---------|-----------|
| user1   | password1 |

RESULT OF LDAP SEARCH: AUTHENTICATION SUCCESSFUL
USER INFORMATION ACQUIRED FROM LDAP:

FIG. 7C

| USER ID | ID NUMBER | CARD ID |
|---------|-----------|---------|
| user1   | number2   | card3   |

CACHE (POST-EXECUTION):

FIG. 7D

| USER ID | ID NUMBER | CARD ID |
|---------|-----------|---------|
| user1   | number1   | card1   |
| user2   | number3   | card2   |
| user3   | number4   | card4   |
| user4   | number2   | card3   |
| user1   |           |         |

FIG. 8A

CACHE (PRE-EXECUTION):

| USER ID | ID NUMBER | CARD ID |
|---|---|---|
| user1 | number1 | card1 |
| user2 | number2 | card2 |
| user3 | number3 | card3 |
| user4 | number4 | card4 |

AUTHENTICATOR SELECTED: USER ID & PASSWORD AUTHENTICATION
AUTHENTICATION INFORMATION ENTERED:

FIG. 8B

| USER ID | PASSWORD |
|---|---|
| user1 | password2 |

RESULT OF LDAP SEARCH: AUTHENTICATION FAILED
USER INFORMATION ACQUIRED FROM LDAP: NONE
CACHE (POST-EXECUTION): NO CHANGE (BECAUSE PASSWORD COMPARISON NOT POSSIBLE)

FIG. 8C

| USER ID | ID NUMBER | CARD ID |
|---|---|---|
| user1 | number1 | card1 |
| user2 | number2 | card2 |
| user3 | number3 | card3 |
| user4 | number4 | card4 |

FIG. 9A

CACHE (PRE-EXECUTION):

| USER ID | ID NUMBER | CARD ID |
|---------|-----------|---------|
| user1   | number1   | card1   |
| user2   | number2   | card2   |
| user3   | number3   | card3   |
| user4   | number4   | card4   |

AUTHENTICATOR SELECTED: ID NUMBER AUTHENTICATION
AUTHENTICATION INFORMATION ENTERED:

FIG. 9B

| ID NUMBER |
|-----------|
| number1   |

RESULT OF LDAP SEARCH: AUTHENTICATION FAILED
USER INFORMATION ACQUIRED FROM LDAP: NONE

FIG. 9C

CACHE (POST-EXECUTION):

| USER ID | ID NUMBER | CARD ID |
|---------|-----------|---------|
| ~~user1~~ | ~~number1~~ | ~~card1~~ |
| user2   | number2   | card2   |
| user3   | number3   | card3   |
| user4   | number4   | card4   | h

FIG. 10A

CACHE (PRE-EXECUTION):

| USER ID B. | ID NUMBER | CARD ID |
|---|---|---|
| user1 | number1 | card1 |
| user2 | number2 | card2 |
| user3 | number3 | card3 |
| user4 | number4 | card4 |

FIG. 10B

AUTHENTICATOR SELECTED: CARD AUTHENTICATION
AUTHENTICATION INFORMATION ENTERED:

| CARD ID |
|---|
| card1 |

RESULT OF LDAP SEARCH: AUTHENTICATION FAILED
USER INFORMATION ACQUIRED FROM LDAP: NONE

FIG. 10C

CACHE (POST-EXECUTION):

| USER ID B. | ID NUMBER | CARD ID |
|---|---|---|
| ~~user1~~ | ~~number1~~ | ~~card1~~ |
| user2 | number2 | card2 |
| user3 | number3 | card3 |
| user4 | number4 | card4 |

FIG. 11A CACHE (PRE-EXECUTION): (ASSUMING UP TO 10 RECORDS CAN BE STORED)

| USER ID | ID NUMBER | CARD ID |
|---|---|---|
| user1 | number1 | card1 |
| user2 | number2 | card2 |
| user3 | number3 | card3 |
| user4 | number4 | card4 |
| user5 | number5 | card5 |
| user6 | number6 | card6 |
| user7 | number7 | card7 |
| user8 | number8 | card8 |
| user9 | number9 | card9 |
| user10 | number10 | card10 |

FIG. 11B AUTHENTICATOR SELECTED: USER ID & PASSWORD AUTHENTICATION
AUTHENTICATION INFORMATION ENTERED:

| USER ID | PASSWORD |
|---|---|
| user11 | password11 |

FIG. 11C RESULT OF LDAP SEARCH: AUTHENTICATION SUCCESSFUL
USER INFORMATION ACQUIRED FROM LDAP:

| USER ID | ID NUMBER | CARD ID |
|---|---|---|
| user11 | password11 | card11 |

FIG. 11D CACHE (POST-EXECUTION):

| USER ID | ID NUMBER | CARD ID |
|---|---|---|
| ~~user1~~ | ~~number1~~ | ~~card1~~ |
| user2 | number2 | card2 |
| user3 | number3 | card3 |
| user4 | number4 | card4 |
| user5 | number5 | card5 |
| user6 | number6 | card6 |
| user7 | number7 | card7 |
| user8 | number8 | card8 |
| user9 | number9 | card9 |
| user10 | number10 | card10 |
| user11 | number11 | card11 |

ELECTRONIC DEVICE

BACKGROUND

1. Technical Field

The present invention relates to an electronic device.

2. Related Art

Some electronic devices, for instance, the printers in offices and the pay-per-use printers in shops, permit use thereof once a user is authenticated.

Lightweight Directory Access Protocol (LDAP) servers have recently grown popular. For example, JP-A-2007-156644 describes employing the user information stored in an LDAP server to provide user authentication.

Furthermore, for instance, when unable to query an LDAP server due to communication problems, or the like, WINDOWS® substitutes the authentication information stored in the cache memory of a terminal during authentication.

However, a user may be erroneously authenticated if the authentication information stored in the cache memory is not accurate, and it is important that the information stored in the cache memory is accurate and up-to-date.

An LDAP server might not provide a password externally in an authentication method requiring the password for user authentication. Authentication might not be possible in these cases if the LDAP server cannot be queried, even if authentication information is stored in the cache memory.

What is also needed is a simple way to perform authentication for a temporary user of the electronic device, and the ability to authenticate a user promptly.

SUMMARY

Therefore, the present invention aims to provide an electronic device that performs authentication of a user where the electronic device improves the convenience of user authentication that employs an LDAP server.

An electronic device configured to connect and communicate with a server storing a plurality of types of authentication information in association with a user for a plurality of users, the electronic device including: a cache information storage for storing user authentication information that is at least a part of the authentication information stored on the server and is at least one type of authentication information that is stored in association with each of the plurality of users; and an authentication controller for running a user authentication process on the basis of authentication information entered by a user, and the authentication information acquired from the server; the authentication controller updating the user authentication information stored in the cache information storage after the user authentication process on the basis of the authentication information entered by the user or the authentication information acquired from the server.

A user can be thus be authenticated with proper authentication information when the server cannot be used, where the authentication information is updated on demand in the cache information storage.

The authentication controller updates the user authentication information per user.

In addition, the authentication information in the cache information storage is updated for each user authentication information record; that is, the update is performed for each user to ensure no erroneous information remains in the cache information storage.

When authentication is successful as a result of the user authentication process, the authentication controller acquires a plurality of types of the authentication information associated with the user who entered the authentication information from the server, deletes the user authentication information which includes any of the plurality of said acquired authentication information, and stores the authentication information acquired as new authentication information in the cache information storage on a per user basis to update the user authentication information.

This maintains the accuracy of the authentication information stored in the cache information storage.

When authentication fails as a result of the user authentication process, the authentication controller deletes the user authentication information which includes the authentication information entered from the cache information storage on a per user basis in order to update the user authentication information.

This maintains the accuracy of the authentication information stored in the cache information storage.

When the server does not provide a password from the authentication information externally, the authentication controller runs the user authentication process with the authentication information that includes a password, and if authentication fails as a result of said user authentication process, the authentication controller does not update the user authentication information.

The authentication controller deletes user authentication information from the cache information storage that was previously registered before deleting user authentication information registered thereafter to update the user authentication information when the size of the user authentication information stored in the cache information storage exceeds a predetermined size.

The authentication controller updates the authentication information in the user authentication information per entry of the authentication information to update the user authentication information.

This takes the most possible advantage of previously registered authentication information.

An electronic device configured to connect and communicate with a server storing a plurality of types of authentication information in association with a user for a plurality of users, the electronic device including: a cache information storage for storing at least a portion of a plurality of types of authentication information stored on the server; and an authentication controller for running a user authentication process on the basis of authentication information acquired from the server; the authentication controller configured to run a user authentication process via a plurality of methods, the methods using different types of said authentication information, and the authentication controller running the user authentication process on the basis of the authentication information stored in the cache information storage when the server cannot be used.

A plurality of authentication methods may be used and authentication is possible when the server cannot be employed, e.g., when there are communication problems; this improves user-friendliness.

When the server does not provide a password from the authentication information externally, the authentication controller prompts the user to use another method when the authentication controller runs the user authentication process via a method that uses a password and the server cannot be used.

This improves user-friendliness.

The electronic device further including: an internal user information storage for storing authentication information; and the authentication controller runs a user authentication process on the basis of the authentication information stored in the internal user information storage, and uses the server to run the user authentication process when unable to determine the success or failure of authentication via a user authentication process using the internal user information storage.

This allows for so-called local authentication and is thus convenient from the perspective of authenticating temporary users and prompt authentication.

Further objectives and features of the present invention will become clear from the embodiments of the present invention described below.

DESCRIPTION OF EMBODIMENTS

Embodiments of the present invention are described below with reference to the drawings. However, these embodiments do not limit the technical scope of the present invention. Note that identical and comparable elements are given the same reference numerals or reference symbols in the drawings.

Figure 1:
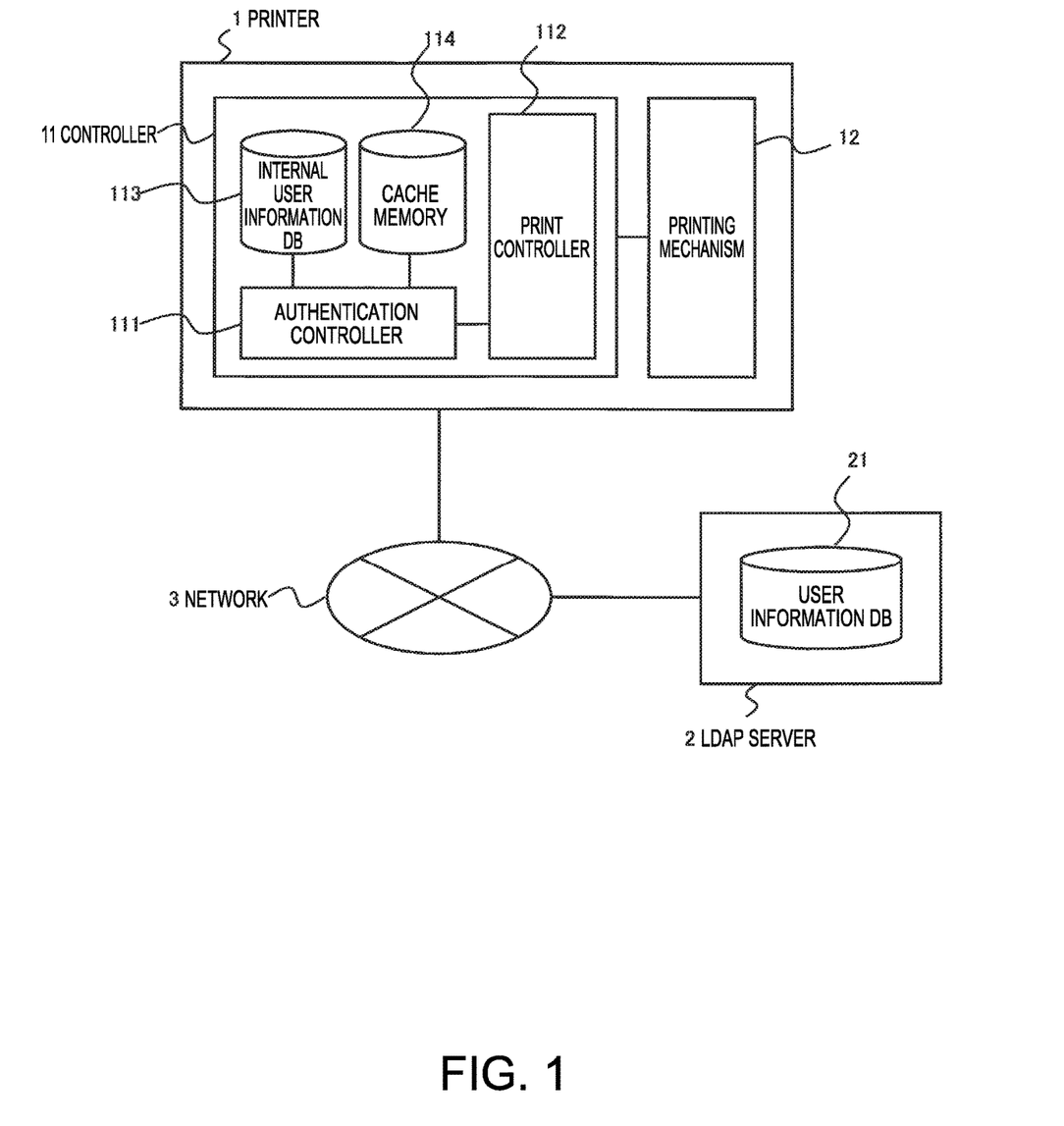
FIG. 1 is a block diagram illustrating an embodiment of an electronic device adopting the present invention.

FIG. 1 is a block diagram illustrating an embodiment of an electronic device adopting the present invention. The printer 1 illustrated in FIG. 1 is an electronic device adopting the present invention; the printer 1 is connected to and able to communicate with a Lightweight Directory Access Protocol (LDAP) server 2, and uses the LDAP server to authenticate a user. The printer 1 stores authentication information from the LDAP server 2 in a cache memory 114; the printer 1 uses the authentication information in the cache memory 114 to authenticate a user when the printer 1 cannot access the LDAP server 2 due to communication problems, or the like. When the printer 1 uses the LDAP server 2 to authenticate a user, the printer 1 runs a process that updates the authentication information stored in the cache memory 114. The printer 1 also carries out user authentication via a plurality of authentication methods which include an authentication method that does not use a Password. The printer 1 further uses an internal user information DB 113 which allows user authentication by and within the printer 1 itself.

With these features, the printer 1 is able to authenticate a user in a very convenient manner.

As illustrated in FIG. 1, the printer 1 is connected to the LDAP server 2 via a network 3, such as a Local Area Network (LAN), or the like.

The printer 1 first carries out the user authentication process when a user attempts to use the printer 1; the printer 1 runs a process, e.g., the user's desired print job, if authentication is successful. In contrast, the printer 1 does not permit the user to run any further processes if authentication fails. In other words, the printer 1 determines whether or not a user is permitted to use the printer 1 via the user authentication process.

As illustrated in FIG. 1, the printer 1 is equipped with a controller 11 and a printing mechanism 12. The controller 11 controls the components of the printer 1 and is provided with a CPU, RAM, ROM, ASIC, and the like.

As illustrated in FIG. 1, the controller 11 is equipped with an authentication controller 111, a print controller 112, an internal user information DB 113, and a cache memory 114 which provide the functions of the controller 11.

The authentication controller 111 manages the above-described user authentication process. The printer 1 supports a plurality of authentication methods (three, in this example). In other words, the printer 1 is provided with a plurality of authenticators (three, in this example).

Figure 2A:
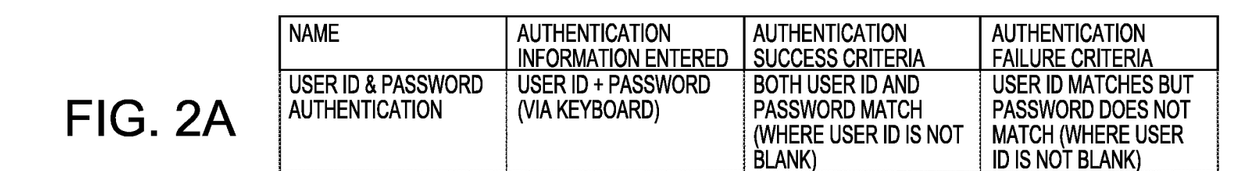
FIGS. 2A-2C illustrates the configurations of a plurality of authentication methods (here, three)
Figure 2B:
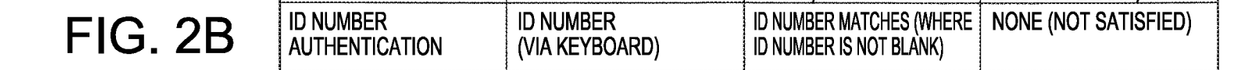
Figure 2C:
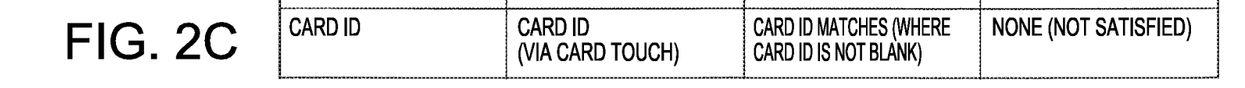

FIG. 2 illustrates the configurations of a plurality of authentication methods (here, three); the column Name in FIG. 2 lists the name of each authentication method; as an example, the printer 1 can authenticate a user via three authentication methods: via User ID and Password Authentication; ID Number Authentication; and Card Authentication.

Each row, (A), (B), and (C) in FIG. 2, lists the Authentication Information Entered, Authentication Success Criteria, and Authentication Failure Criteria for each of the authentication methods. The Authentication Information Entered describes the type of authentication information the user enters into the printer 1 and the method of input.

As illustrated in FIG. 2, this embodiment handles four types of authentication information: User ID; Password; ID Number; and Card ID. Note that a keyboard, card reader, or the like (not shown) are provided to the printer 1 as input devices.

A user may be authenticated by employing any of these three authentication methods.

The printer 1 (the authentication controller 111) uses the data (authentication information) stored in the three types of data storage devices i.e., the internal user information DB 113, the cache memory 114, and the user information DB 21 in the LDAP server 2 to authenticate a user.

The authentication controller 111 in the printer 1 performs a distinctive authentication process, the specifics of which are described later. Note that the authentication controller 111 is configured from a program directing the authentication process and a CPU or the like that executes the process in accordance with said program.

The print controller 112 controls the printing process directed by the user if user authentication is successful.

The internal user information DB 113 (the internal user information storage) is a database that allows the printer 1 itself to authenticate a user without using the LDAP server 2; that is, the internal user information DB 113 allows so-called local authentication. The internal user information DB 113 stores authentication information such as information on users that frequently use the printer 1, and information on users that temporarily use the printer 1. The authentication information stored by the internal user information DB 113 include: the User ID; Password; ID Number; and Card ID. The internal user information DB 113 may be configured from a hard drive, NVRAM, or the like.

The cache memory 114 (cache information storage) temporarily retains data, such as the data the printer 1 acquired via the network 3. As above described, the cache memory 114 temporarily holds (caches) authentication information stored in the LDAP server 2.

Figure 3:
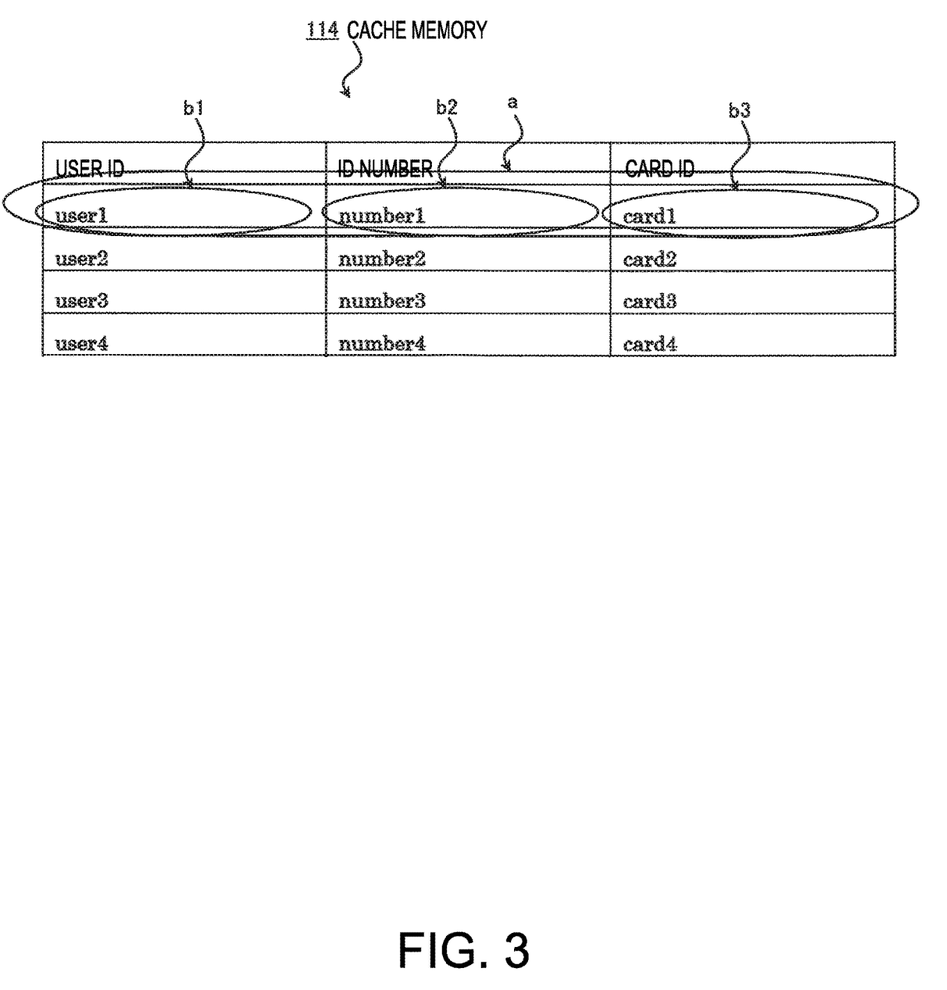
FIG. 3 illustrates an example of authentication information stored in a cache memory 114.

FIG. 3 illustrates an example of authentication information stored in a cache memory 114; as illustrated in FIG. 3, the cache memory 114 stores three types of authentication information: User ID; ID Number; and Card ID. In this embodiment, the LDAP server 2 (later described) is designed to not provide the Password in the authentication information externally. The cache memory 114 does not include the Password in the authentication information because the printer 1 cannot acquire the Password in the authentication information from the LDAP server 2.

In the information illustrated in FIG. 3, a single record (e.g., the section enclosed in circle 'a') represents the authentication information for a single user; for the sake of convenience, in this description, the information in a single record, i.e., the User ID; ID Number; and Card ID for a user is collectively referred to as the user authentication information. In contrast, each authentication information entry (e.g., the sections enclosed in circles b1, b2, and b3, respectively) is referred to as authentication information.

As above described, the user authentication information stored in the cache memory 114 is updated as appropriate.

The cache memory 114 is configured from RAM and the like, and is assigned a predetermined capacity for storing authentication information. Accordingly, the data that is registered earlier is deleted when the amount of information increases and exceeds the aforementioned capacity. Note that the cache memory 114 may be non-volatile memory.

Next, the printing mechanism 12 executes the above-described printing process and operates under the control of the print controller 112 to print on a print medium such as paper. For example, for inkjet printing, the printing mechanism 12 includes a print head equipped with a plurality of nozzles that eject ink, and a print medium conveyance.

Next, the LDAP server 2 is a server providing directory services on the network 3, and as illustrated in FIG. 1, is provided with a user information DB 21.

The user information DB 21 contains four types authentication information used by the printer 1 for each user, i.e., the user information DB 21 contains information including a User ID, Password, ID Number, and Card ID for each user. As above described, it is assumed that in this embodiment, the LDAP server 2 does not output password information externally.

The LDAP server 2 is provided with a CPU, RAM, ROM, hard drive, communication interface, user interface, and the like, with the user information DB 21 configured from a hard drive, or the like.

A printer 1 configured as above described, first executes a user authentication process when a user uses the printer 1 and carries out a requested print process, or the like if authentication is successful. Here, the printer 1 executes a distinctive user authentication process, the specifics of which are described below.

Figure 4:
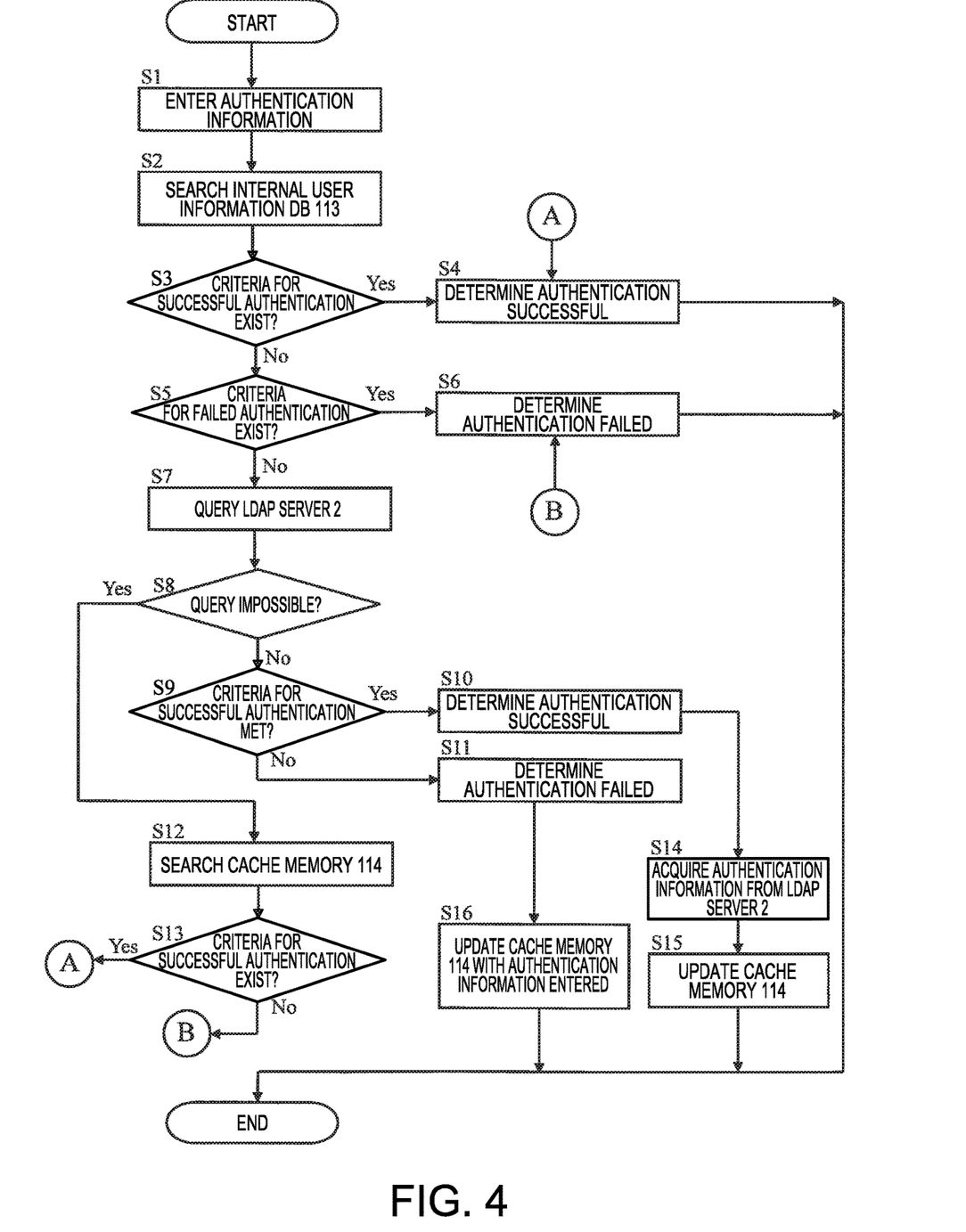
FIG. 4 is a flowchart depicting a procedure for a user authentication process.

FIG. 4 is a flowchart depicting a procedure for a user authentication process. First, the user attempting to use the printer 1 enters authentication information (step S1, FIG. 4). More specifically, the user manually enters authentication information corresponding to the authentication method selected via an input method corresponding to the aforementioned authentication information. The user may enter a user ID and a password using a keyboard on the printer 1, e.g., for User ID and Password Authentication; or, the user may hold a card storing the card ID over a card reader on the printer 1, e.g., for Card Authentication.

Once the authentication information is received, the authentication controller 111 first attempts (runs) local authentication. More specifically, the authentication controller 111 accesses the internal user information DB 113 and searches the information stored therein on the basis of the authentication information entered (step S2, FIG. 4).

The authentication controller 111 determines that authentication is successful (step S4, FIG. 4) when information satisfying the "Authentication Success Criteria" (FIG. 2) is found in the internal user information DB 113 (Yes at step S3, FIG. 4). In this case, the authentication controller 111 ends the user authentication process at the aforementioned process step.

In contrast, the authentication controller 111 determines that authentication has failed (step S6, FIG. 4) when information satisfying the Authentication Failure Criteria (FIG. 2) is found in the internal user information DB 113 (Yes at step S5, FIG. 4). In this case, the authentication controller 111 ends the user authentication process at the aforementioned process step.

For instance, during User ID and Password Authentication the authentication controller 111 determines that the Authentication Success Criteria is satisfied when both the user ID and the password entered match information found in the internal user information DB 113. In contrast, the authentication controller 111 determines that the Authentication Failure Criteria is satisfied when the user ID entered is found in the internal user information DB 113 but the corresponding password does not match the password entered.

In addition, for example, during Card Authentication, the authentication controller 111 determines the Authentication Success Criteria is satisfied when a card ID matching the card ID read from the card is found in the internal user information DB 113. In contrast, during Card Authentication the Authentication Failure Criteria is None as illustrated in FIG. 2; therefore, the Authentication Failure Criteria cannot be satisfied.

Local authentication thus ends, and if no determination was made on the success or failure of authentication (No at step S5, FIG. 4), the authentication controller 111 executes authentication processing using the LDAP server 2.

The authentication controller 111 accesses the LDAP server 2 and requests authentication information on the basis of the authentication information entered (step S7, FIG. 4). At this point, the authentication controller 111 transitions to authentication processing using the cache memory 114 if it is not possible to request the authentication information from the LDAP server 2, e.g., due to a communication error or a malfunction in the LDAP server 2 (Yes at step S8, FIG. 4).

The authentication controller 111 authenticates a user via the LDAP server 2 when the authentication controller 111 is able to request the authentication information from the LDAP server 2 (No at step S8, FIG. 4). More specifically, the authentication controller 111 determines that authentication is successful (step S10, FIG. 4) when information satisfying the "Authentication Success Criteria" (FIG. 2) is found in the user information DB 21 (Yes at step S9, FIG. 4).

In contrast, when information satisfying the above-mentioned Authentication Success Criteria cannot be found (No at step S9, FIG. 4), the authentication controller 111 determines that authentication failed (step S11, FIG. 4).

Thus, the authentication controller 111 updates the user authentication information stored in the cache memory 114 when authenticating via the LDAP server 2. The processing switches to step S14 if the authentication controller 111 determines that authentication is successful (step S10, FIG. 4) and switches to step S16 if the authentication controller 111 determines that authentication failed (step S11, FIG. 4).

Whereas, the authentication controller 111 searches the cache memory 114 on the basis of the authentication information entered (step S12, FIG. 4) if the authentication controller 111 is unable to query the LDAP server 2 (Yes at step S8, FIG. 4). The authentication controller 111 determines that authentication is successful (step S4, FIG. 4) when information satisfying the Authentication Success Criteria (FIG. 2) is found (Yes at step S13, FIG. 4) in the cache memory 114.

In contrast, when information satisfying the above-mentioned authentication success criteria cannot be found (No at step S13, FIG. 4), the authentication controller 111 determines that authentication failed (step S6, FIG. 4). As above described, the authentication controller 111 determines that authentication fails during User ID and Password Authentication because the cache memory 114 does not store the Password in the authentication information (step S6, FIG. 4).

The user authentication process ends after the authentication controller 111 determines the success or failure of authentication (steps S4 and S6, FIG. 4).

Next, the authentication controller 111 acquires authentication information from the LDAP server 2 (step S14, FIG. 4) during the above-described update process, if the authentication controller 111 determines that authentication was successful (step S10, FIG. 4) when authenticating via the LDAP server 2. More specifically, the authentication controller 111 acquires authentication information from the LDAP server 2 for users who satisfied the "Authentication Success Criteria"; all the authentication information acquired is authentication information used by the printer 1. However, as above described, because the Password from the authentication information cannot be obtained, in this embodiment, it is the User ID, the ID Number, and the Card ID that are acquired.

The authentication controller 111 subsequently updates the authentication information stored in the cache memory 114 on the basis of the authentication information acquired (step S15, FIG. 4). More specifically, the authentication controller 111 deletes all the user authentication information if the user authentication information (i.e., information record per user) stored in the cache memory 114 contains any of the authentication information acquired. For example, if there are two records of user authentication information that include the authentication information acquired, those two records of user authentication information, namely, the two user authentication information records, are deleted.

Subsequently, the authentication controller 111 registers the authentication information acquired from the LDAP server 2 as one user authentication information record in the cache memory 114.

Upon this registration, the authentication controller 111 adds information that identifies the order in which the information is registered (i.e., recorded) to the cache memory 114. For example, the authentication controller 111 may add information on the registration date and time, a number representing the order in which the information in the user authentication information was registered, or a number representing the order in which the information in the user authentication information was deleted.

The authentication controller 111 may delete the oldest (the earliest stored) user authentication information and then register information during registration when the authentication information stored in the cache memory 114 is about to exceed the assigned capacity.

In contrast, the authentication controller 111 updates the authentication information in the cache memory 114 (step S16, FIG. 4) on the basis of the authentication information entered (step S1, FIG. 4) if the authentication controller 111 determines that authentication failed (step S11, FIG. 4) during the above described update process carried out when authenticating via the LDAP server 2.

More specifically, the authentication controller 111 deletes the user authentication information in the cache memory 114 if the user authentication information (i.e., information record per user) stored in the cache memory 114 contains the authentication information entered.

The authentication controller 111 does not update the aforementioned cache memory 114 if the authentication controller 111 determines that authentication failed during User ID and Password Authentication.

The user authentication process thus ends when updating the cache memory 114 ends.

It is also possible for the LDAP server 2 to determine the success or failure of authentication at the end of searching the user information DB 21 during authentication via the LDAP server 2.

Specific working examples of updating the cache memory 114 are described next.

Embodiment 1

FIG. 5 illustrates the authentication information at various stages in embodiment 1. Embodiment 1 is an example of successful User ID and Password Authentication using the LDAP server 2.

Figure 5A:
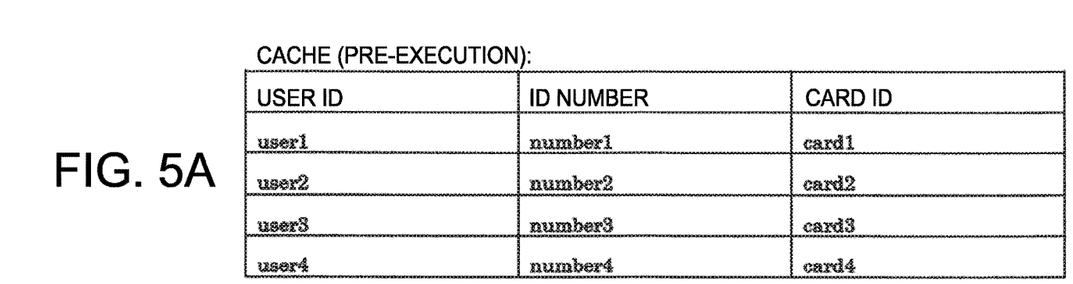
FIGS. 5A-5D illustrates the authentication information at various stages in embodiment 1.
Figure 5B:
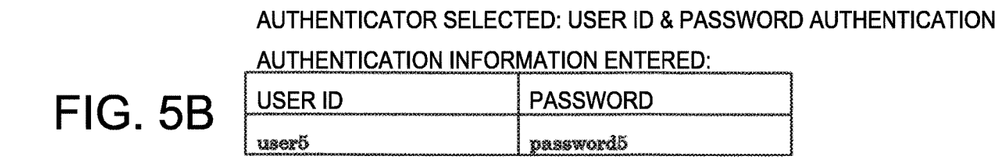
Figure 5C:
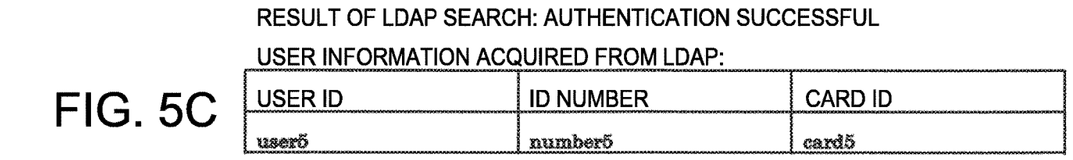
Figure 5D:
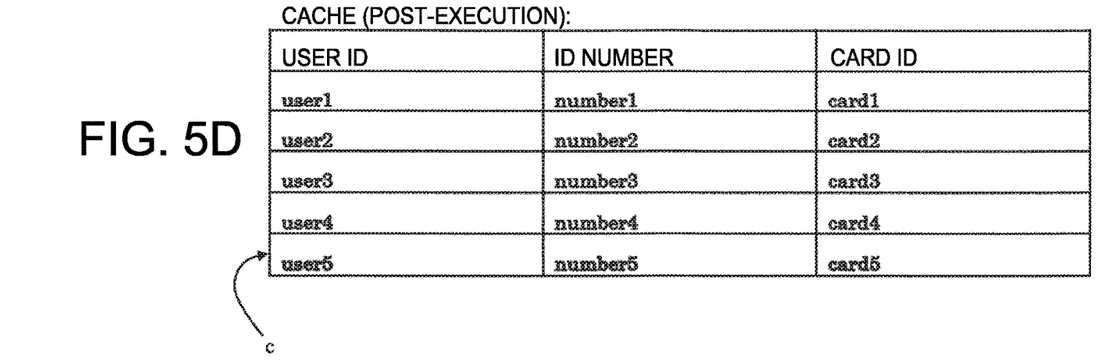

FIG. 5A depicts the state of the authentication information in the cache memory 114 prior to authentication processing. In this example the user authentication information for four users are stored (registered) in the cache memory 114. FIG. 5B depicts the authentication information entered by a user. FIG. 5C depicts the authentication information acquired from the LDAP server 2 after authentication was successful. FIG. 5D depicts the state of the authentication information in the cache memory 114 after the update process.

In this example, because the authentication information acquired (FIG. 5C) is not among the user authentication information stored in the cache memory 114 (FIG. 5A), the authentication information acquired is registered ('c' in FIG. 5) in the cache memory 114 as one user authentication information record without deleting any of the existing user authentication information (records).

Embodiment 2

FIG. 6 illustrates the authentication information at various stages in embodiment 2. Embodiment 2 is an example of successful User ID and Password Authentication using the LDAP server 2.

FIG. 6A through FIG. 6D depict the authentication information at stages identical to the stages depicted in FIG. 5A through FIG. 5D.

Figure 6A:
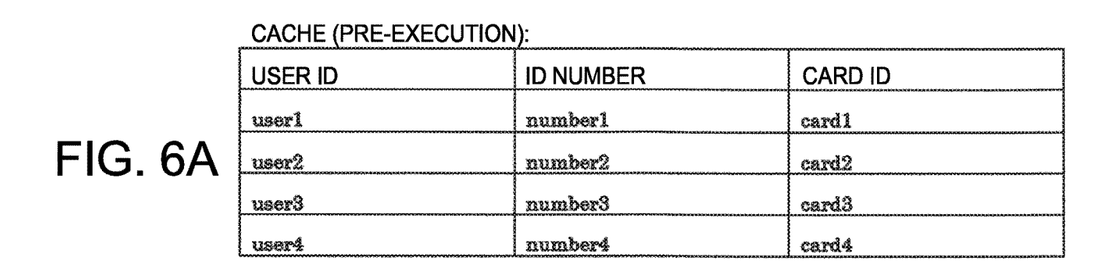
FIGS. 6A-6D illustrates the authentication information at various stages in embodiment 2.
Figure 6B:
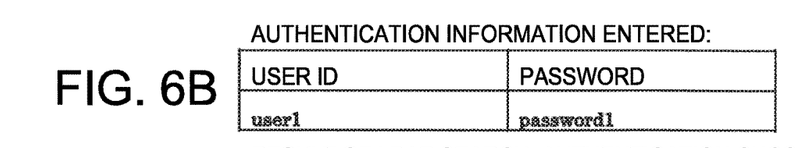
Figure 6C:
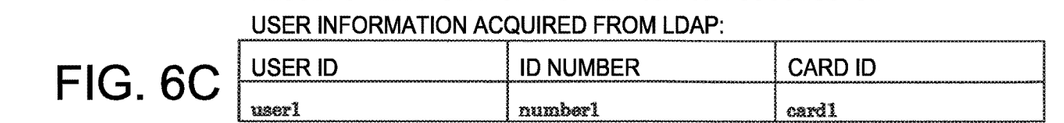
Figure 6D:
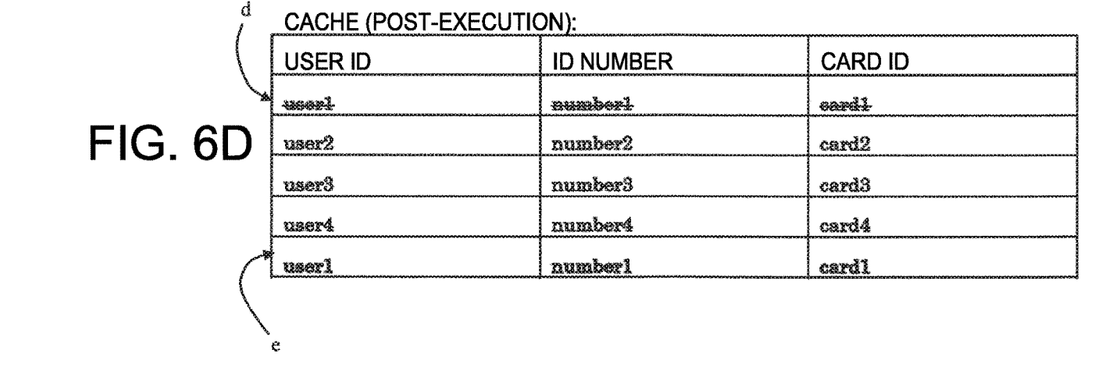

In this example, the authentication information acquired (FIG. 6C) exists in one user authentication information record stored in the cache memory 114 (FIG. 6A); therefore, the user authentication information (record) is deleted ('d' in FIG. 6) and the authentication information acquired is registered in the cache memory 114 ('e' in FIG. 6) as one user authentication information record.

Embodiment 3

FIG. 7 illustrates the authentication information at various stages in embodiment 3. Embodiment 3 is an example of successful User ID and Password Authentication using the LDAP server 2.

FIG. 7A through FIG. 7D depict the authentication information at stages identical to the stages illustrated in FIG. 5A through FIG. 5D.

Figure 7A:
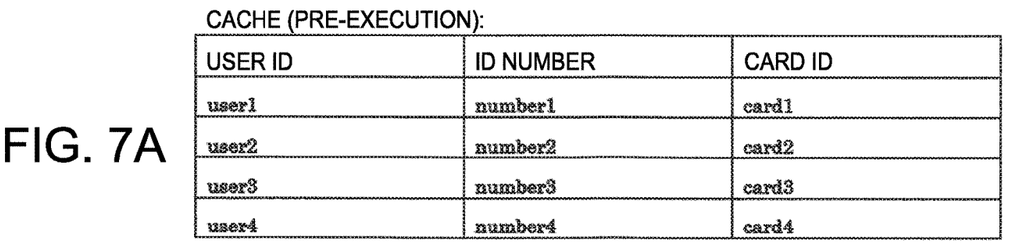
FIGS. 7A-7D illustrates the authentication information at various stages in embodiment 3.
Figure 7B:
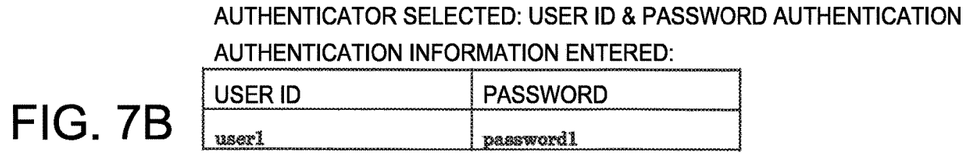
Figure 7C:
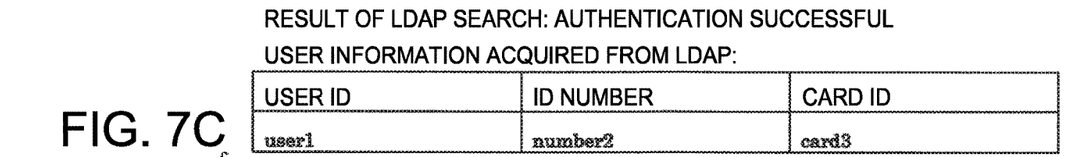
Figure 7D:
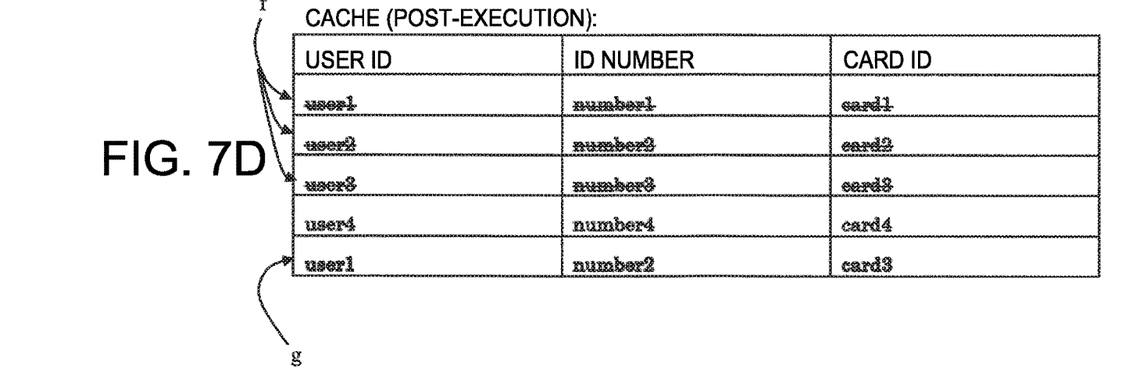

In this example, the authentication information acquired (FIG. 7C) exists in three user authentication information records stored in the cache memory 114 (FIG. 7A); therefore, those user authentication information records (three records) are deleted ('f' in FIG. 7) and the authentication information acquired is registered in the cache memory 114 ('g' in FIG. 7) as one user authentication information record.

Embodiment 4

Figure 8A:
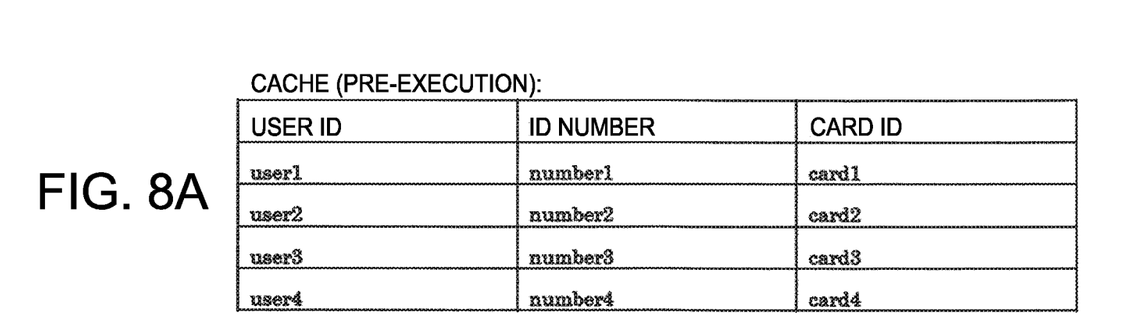
FIGS. 8A-8C illustrates the authentication information at various stages in embodiment 4.
Figure 8B:
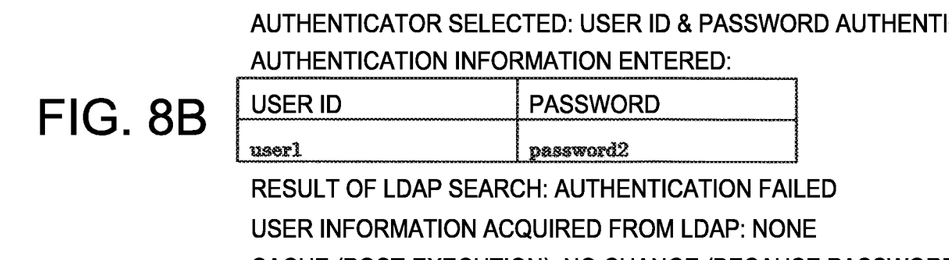
Figure 8C:
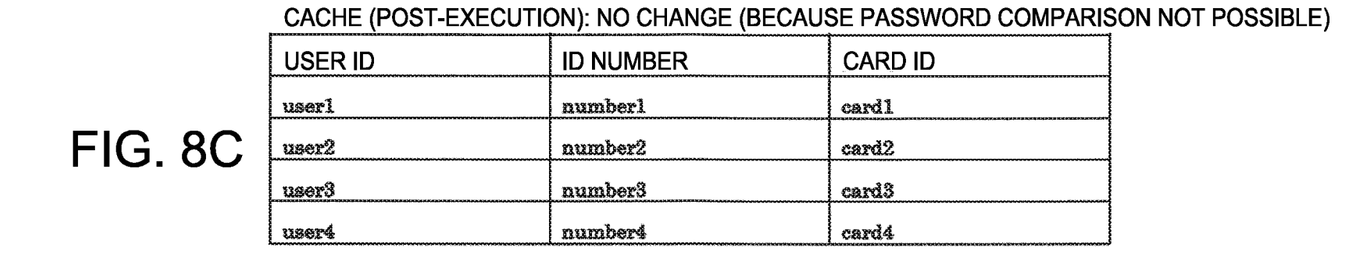

FIG. 8 illustrates the authentication information at various stages in embodiment 4. Embodiment 4 is an example where User ID and Password Authentication using the LDAP server 2 fails.

FIG. 8A depicts the state of the authentication information in the cache memory 114 prior to authentication processing. FIG. 8B depicts the authentication information entered by a user. FIG. 8C depicts the state of the authentication information in the cache memory 114 after the update process.

In this example, the User ID and Password Authentication fails; therefore, as above described, the user authentication information stored in the cache memory 114 is not updated.

Embodiment 5

Figure 9A:
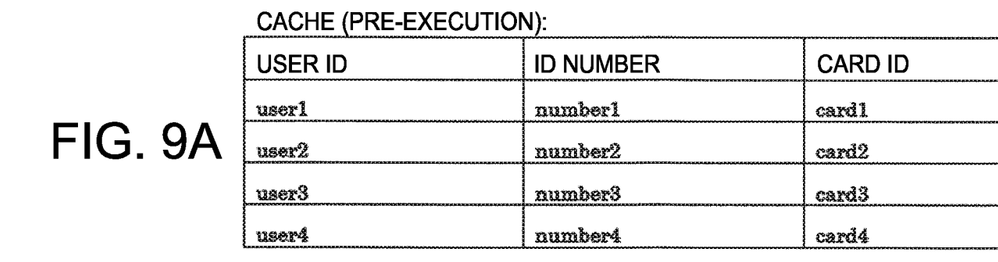
FIGS. 9A-9C illustrates the authentication information at various stages in embodiment 5.
Figure 9B:
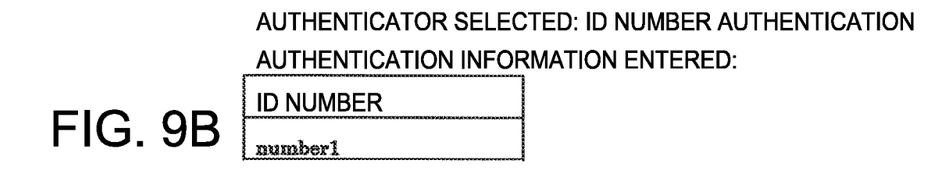
Figure 9C:
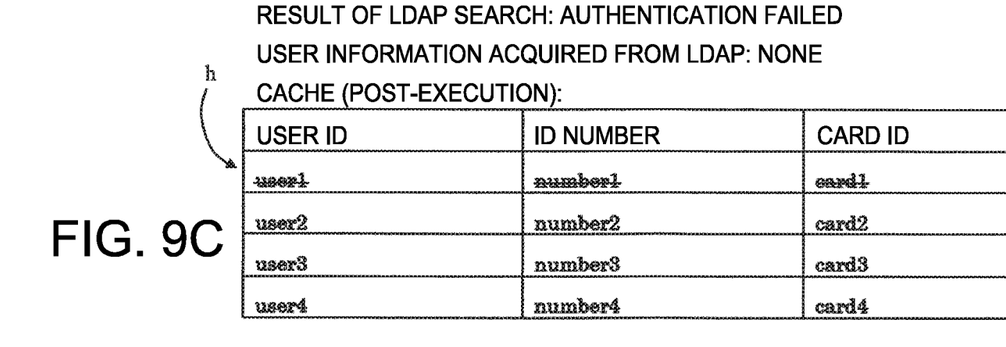

FIG. 9 illustrates the authentication information at various stages in embodiment 5. Embodiment 5 is an example where ID Number Authentication using the LDAP server 2 fails.

FIG. 9A through FIG. 9C depict the authentication information at stages identical to the stages illustrated in FIG. 8A through FIG. 8C.

In this example, the user authentication information that includes the authentication information entered (FIG. 9B) exists in the user authentication information stored in the cache memory 114; therefore, the user authentication information (record) is deleted ('h' in FIG. 9).

Embodiment 6

Figure 10A:
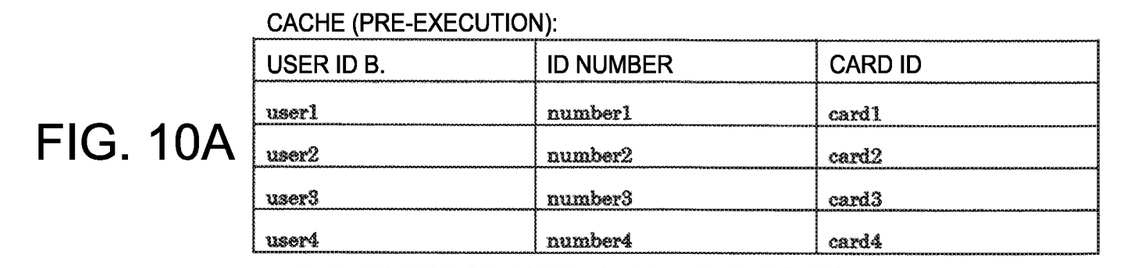
FIGS. 10A-10C illustrates the authentication information at various stages in embodiment 6.
Figure 10B:
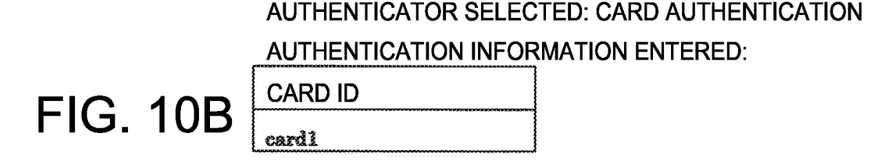
Figure 10C:
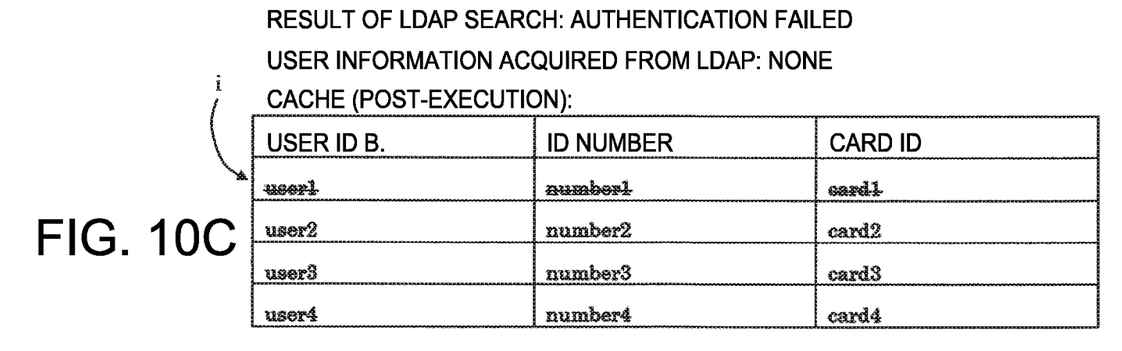

FIG. 10 illustrates the authentication information at various stages in embodiment 6. Embodiment 6 is an example where Card Authentication using the LDAP server 2 fails.

FIG. 10A through FIG. 10C depict the authentication information at stages identical to the stages illustrated in FIG. 8A through FIG. 8C.

In this example, the user authentication information that includes the authentication information entered (FIG. 10B) exists in the user authentication information stored in the cache memory 114; therefore, the user authentication information (record) is deleted ('i' in FIG. 10).

Embodiment 7

FIG. 11 illustrates the authentication information at various stages in embodiment 7. Embodiment 7 is an example of successful User ID and Password Authentication using the LDAP server 2.

FIG. 11A through FIG. 11D depict the authentication information at stages identical to the stages illustrated in FIG. 5A through FIG. 5D.

Figure 11A:
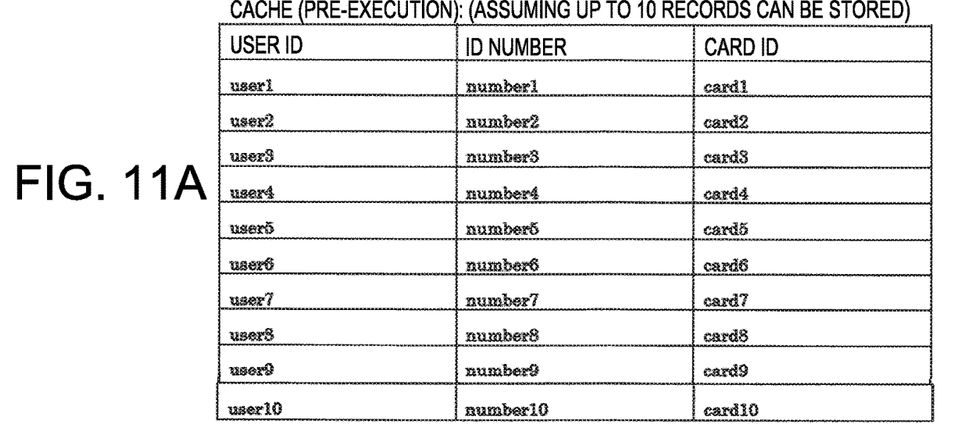
FIGS. 11A-11D illustrates the authentication information at various stages in embodiment 7.
Figure 11B:
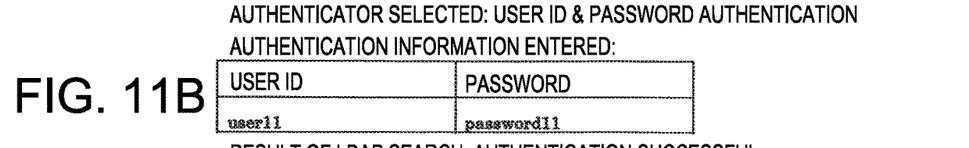
Figure 11C:
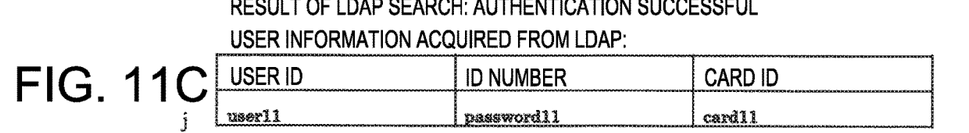
Figure 11D:
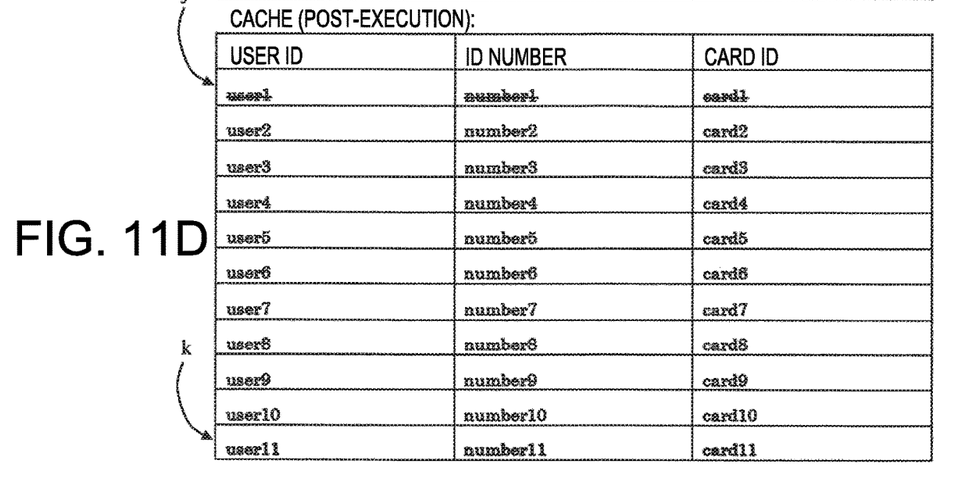

In this example, the cache memory 114 holds 10 records, i.e., the maximum number of user authentication information records (FIG. 11A), and the user authentication information recently acquired cannot be registered. Therefore, the oldest (the earliest registered) user authentication information is first deleted ('j' in FIG. 11). The authentication information acquired is then registered in the cache memory 114 as a single user authentication information record ('k' in FIG. 11).

In the above described embodiments, the authentication controller 111 updates the authentication information in the cache memory 114 per user authentication information record. However, the authentication controller 111 may be configured to delete the authentication information matching the authentication information acquired and not all the user authentication information records when deleting information on the basis of authentication information acquired from the LDAP server 2.

For instance, in embodiment 3, the authentication controller 111 could be configured to delete only the authentication information acquired from the LDAP server 2, i.e., 'number2' from the record without deleting all the user authentication information, i.e., 'user2', 'number2', and 'card2'.

The authentication controller 111 may also be configured to delete the authentication information matching the authentication information entered and not all the user authentication information in the same manner when authentication via the LDAP server 2 fails and authentication information is deleted on the basis of the authentication information the user enters.

For instance, in embodiment 5, the authentication controller 111 may be configured to delete only the authentication information entered, i.e., 'number1' from the record without deleting all the user authentication information, i.e., 'user1', 'number1', and 'card1'.

As above described in this embodiment, given that a password is not included in the authentication information in the cache memory 114, user authentication via User ID and Password Authentication cannot be performed when it is not possible to query the LDAP server 2, such as when there are communication problems.

Therefore, in this case, namely, when a user enters a user ID and a password (step S1, FIG. 4) and no determination is made during local authentication ('No' in step S5, FIG. 4) and it is not possible to query the LDAP server 2 ('Yes' in step S8, FIG. 4), the authentication controller 111 may prompt the user to choose another authentication method that does not use a password, such as, in this case, ID Number Authentication or Card Authentication. For instance, a display device (not shown) on the printer 1 may be configured to present such a message.

As above described, a printer 1 according to the embodiments and modification examples thereof updates the authentication information stored in the cache memory 114, as appropriate, each time the LDAP server 2 is used to authenticate a user. Therefore, user authentication can be performed on the basis of the most recent correct information stored in the cache memory 114 even in situations where a request cannot be sent to the LDAP server 2.

In addition, the authentication information in the cache memory 114 is updated for each user authentication information record; that is, the update is performed for each user to ensure no erroneous information remains in the cache memory 114.

The earliest registered (oldest) authentication information is deleted when the authentication information to be registered exceeds the capacity assigned in the cache memory 114.

As above described, another alternative may be to delete the authentication information entries when updating the information in the cache memory 114 to thereby take the most advantage possible of previously registered information.

Because the printer 1 provides a plurality of authentication methods including one in which the LDAP server 2 does not output certain authentication information externally (e.g., a password), the printer 1 can perform authentication with just the information from the LDAP server 2 saved in the cache memory 114. Consequently, the printer 1 can perform user authentication even when it is not possible to query the LDAP server 2, e.g., when the LDAP server 2 malfunctions, and this improves its utility.

Additionally, in some cases the LDAP server 2 might not provide certain authentication information (e.g., a password) externally for a given authentication method. However, prompting a user to select another authentication method when the LDAP server 2 cannot be queried also improves the user-friendliness of the printer.

The printer 1 is also equipped with an internal user information DB 113 making local authentication possible. The printer 1 is thus suited to authenticating temporary users and to prompt authentication, further improving the user-friendliness of the printer.

The present invention may be adopted in electronic devices besides printers.

The scope of protection for the present invention is not limited to the above-described embodiments and extends to the invention and the equivalents thereof defined by the scope of the claims.

The entire disclosure of Japanese Patent Application No. 2018-004012, filed Jan. 15, 2018 is expressly incorporated by reference herein.

What is claimed is:

1. An electronic device configured to connect and communicate with a server storing a plurality of types of authentication information in association with a user for a plurality of users, the electronic device comprising:

a cache information storage configured to store user authentication information that is at least a part of the authentication information stored on the server and is at least one type of authentication information that is stored in association with each of the plurality of users; and an authentication controller configured to run a user authentication process on the basis of-authentication information entered by a user and authentication information acquired from the server to, when the authentication information entered by the user and the authentication information meet criteria for successful authentication, permit access to operating functionality of the electronic device;

the authentication controller updating the user authentication information stored in the cache information storage after the user authentication process on the basis of the authentication information entered by the user or the authentication information acquired from the server, wherein, when authentication is successful as a result of the user authentication process, the authentication controller acquires a plurality of types of the authentication information associated with the user who entered the authentication information from the server, deletes the user authentication information which includes any of the plurality of said acquired authentication information, and stores the authentication information acquired as new authentication information in the cache information storage on a per user basis to update the user authentication information, and the authentication controller deletes user authentication information from the cache information storage that was previously registered before deleting user authentication information registered thereafter to update the user authentication information when the size of the user authentication information stored in the cache information storage exceeds a predetermined size.

2. The electronic device according to claim 1, wherein: when updating the user authentication information, the authentication controller updates the user authentication information by authentication information unit.

3. The electronic device according to claim 1, further comprising:

an internal user information storage configured to store authentication information;

wherein the authentication controller runs the user authentication process on the basis of the authentication information stored in the internal user information storage, and uses the server to run the user authentication process when unable to determine the success or failure of authentication via the user authentication process using the internal user information storage.

* * * * *